United States Patent [19]

Naito et al.

[11] 4,368,025

[45] Jan. 11, 1983

[54] EXTRUSION DEVICE FOR PRODUCING HONEYCOMB STRUCTURES

[75] Inventors: Junichiro Naito, Toyokawa; Shinichi Yamamoto, Takahama; Zituo Suzuki, Aichi; Mitsuru Asano, Okazaki, all of Japan

[73] Assignee: Nippon Soken, Inc., Nishio, Japan

[21] Appl. No.: 226,772

[22] Filed: Jan. 21, 1981

Related U.S. Application Data

[63] Continuation-in-part of Ser. No. 214,984, Dec. 10, 1980, and Ser. No. 222,068, Jan. 2, 1981.

[30] Foreign Application Priority Data

Jan. 21, 1980 [JP] Japan .................................. 55-5505

[51] Int. Cl.³ .............................................. B29F 3/04
[52] U.S. Cl. .................. 425/462; 264/177 R; 425/380; 425/467
[58] Field of Search ............... 425/462, 463, 461, 464, 425/465, 467, 380, 197-199, 376 A; 264/177 R; 428/116

[56] References Cited

U.S. PATENT DOCUMENTS

| 3,790,654 | 2/1974 | Bagley | 264/177 R |
| 3,947,214 | 3/1976 | Cunningham | 425/380 |
| 3,983,283 | 9/1976 | Bagley | 425/461 |
| 4,008,033 | 2/1977 | Folmar et al. | 425/380 |
| 4,042,738 | 8/1977 | Gulati | 428/116 |
| 4,168,944 | 9/1979 | Morikawa et al. | 425/382 R |
| 4,178,145 | 12/1979 | Hamamoto et al. | 425/467 |
| 4,233,351 | 11/1980 | Okumura et al. | 428/116 |
| 4,278,412 | 7/1981 | Ozaki et al. | 425/464 |

*Primary Examiner*—Jeffery R. Thurlow
*Attorney, Agent, or Firm*—Cushman, Darby & Cushman

[57] ABSTRACT

An extrusion device comprises a die provided with feed passageways and grid-shaped extrusion slots, and a die mask covering the peripheral portion of the die on the extrudable material outlet side. The die mask is provided with a plurality of disconnected openings which are formed in the lower end of the inner surface thereof at predetermined intervals so as to be communicated with the extrusion slots of the peripheral portion of the die. By this extrusion device, the extrudable material is supplied from the openings into the outer periphery of the extruded body to form a honeycomb structure having a smooth outer peripheral surface and a thick outer wall.

5 Claims, 13 Drawing Figures

EXTRUSION DEVICE FOR PRODUCING HONEYCOMB STRUCTURES

This application is a continuation-in-part of our co-pending applications Ser. No. 214,984 filed Dec. 10, 1980, and Ser. No. 222,068 filed Jan. 2, 1981.

BACKGROUND OF THE INVENTION

The present invention relates to a device for extruding honeycomb structures which are used as catalyst supports, heat exchangers or filters.

Conventionally, the mechanical strength of the whole of the ceramic honeycomb structure or of the outer peripheral portion thereof has been improved by forming an outer wall B which is thicker than a grid-shaped wall A, in the outer periphery of the honeycomb structure as shown in FIG. 1.

For extruding such a honeycomb structure as described above, devices as shown in FIGS. 2 and 3 are conventionally used. These devices are provided with a die mask 1 having an inner surface 31 of a smaller diameter than an extrusion die 3, in the outer periphery of the outlet side of the extrusion die 3 disposed within a cylinder 2 respectively.

The extrudable material which was supplied from the cylinder 2 passes feed passageways 4 and grid-shaped extrusion slots 5 which are formed within the die 3, under pressure to be extruded therefrom.

Then, the extruded body is formed by the inner wall 31 of the die mask 1 into a predetermined outer form and the thick outer wall is also formed.

However, according to the device of FIG. 2, the material is pressed by the tapered inner wall 31 of the die mask 1 toward the center thereof after being extruded out of the die 3. Therefore, distortion is easy to occur in the connecting portion C between the grid-shaped wall A and the outer wall B of the obtained honeycomb structure as shown in FIG. 4. As a result, the mechanical strength of the connecting portion C is decreased.

And in the device of FIG. 3, the die mask 1 which is contacted with the die 3 is provided with an opening portion 30 in the whole circumference of the inner wall 31 thereof. In the outer periphery of the obtained product, the thick outer wall is formed by the material which is supplied from the extrusion slots of the outer peripheral portion of the die 3 through the opening portion 30.

However, according to the device of FIG. 3, since the connecting portion C shown in FIG. 4 is crushed by the material supplied to the outer periphery of the extruded body, distortion is easy to occur therein.

Accordingly, one object of the present invention is to provide an extrusion device for producing honeycomb structure having an excellent mechanical strength.

Another object of the present invention is to provide an extrusion device for producing honeycomb structures provided with a thick outer wall respectively without producing any distortion in the grid-shaped wall surrounding a large number of open passages.

Still another object of the present invention is to provide an extrusion device for producing honeycomb structures of which outer peripheral surface is smooth.

Further object of the present invention is to provide an extrusion device for producing honeycomb structures having an excellent thermal shock resistance.

DESCRIPTION OF THE DRAWINGS

Other objects and advantages of the invention will become apparent from the following description of embodiments with reference to the accompanying drawings wherein:

FIG. 5 is a fragmentary longitudinally sectioned view of a half of the device of the first embodiment;

FIG. 6 is a fragmentary schematic plane view of FIG. 5;

FIG. 7 is a fragmentary longitudinally sectioned view of a half of the device of the second embodiment;

FIG. 8 is a fragmentary schematic plane view of FIG. 7;

SUMMARY OF THE INVENTION

The extrusion device of the present invention comprises a die mask covering the peripheral portion of the die, which is provided with a plurality of disconnected openings which are formed in the lower end of the inner surface thereof at predetermined intervals for supplying the extrudable material into the outer periphery of the extruded body which was extruded out of the die to form a honeycomb structure having a smooth outer peripheral surface and a thick outer wall.

DETAILED DESCRIPTION OF THE INVENTION

Hereinafter, the present invention will be explained in detail in accordance with embodiments with reference to the accompanying drawings.

Figure 5:
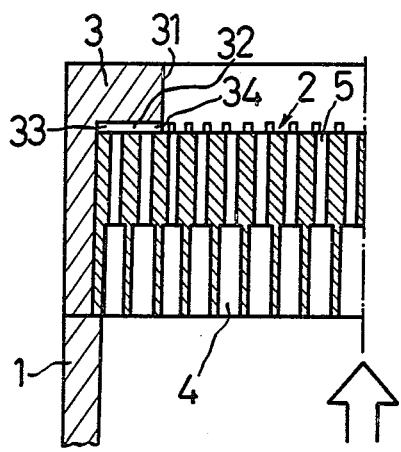
FIG. 5 and FIG. 6 show a first embodiment of the present invention.
Figure 6:
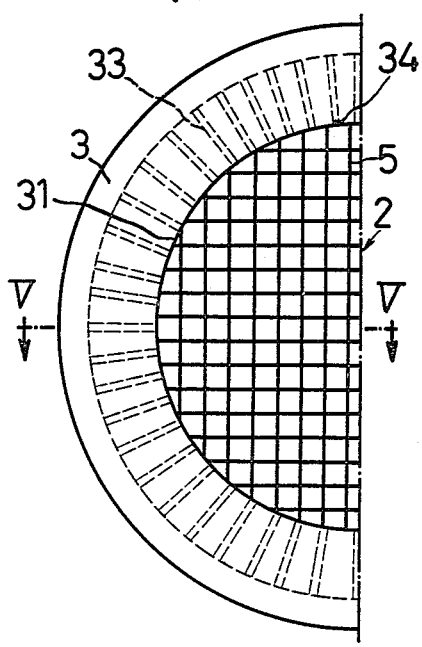

FIG. 5 and FIG. 6 show a first embodiment of the present invention.

In the first embodiment, a die 2 has a circular outer form and is fixed between a cylinder 1 and a die mask 3 which is secured to the top end of the cylinder 1.

A plurality of circular feed passageways 4 are disconnectedly formed in the die 2 from the side of the cylinder 1 that is the extrudable material inlet side thereof. Inter-connected grid-shaped extrusion slots 5 are formed from the side of the die mask 3, that is the extrudable material outlet side of the die 2.

These feed passageways 4 and extrusion slots 5 are communicated with each other in the axially central portion of the die 2.

The feed passageways 4 have the same diameter with each other and are arranged at predetermined intervals and the extrusion slots 5 have the same width with each other and are arranged at predetermined intervals.

The die mask 3 is provided with an inner surface 31 having a diameter smaller than that of the die 2 on the extrudable material outlet side.

The outer shape of the honeycomb structure which is extruded out of the die 2 is formed by the inner surface 31.

The die mask 3 has an annular wall 32 which opposes to the end surface of the outer peripheral portion of the die 2 so as to cover it. A large number of grooves 33 having a square cross section respectively are radially formed in the annular wall 32. And there are formed a large number of openings 34 at predetermined very small intervals in the lower end portion of the inner surface 31 of the die mask 3.

Figure 7:
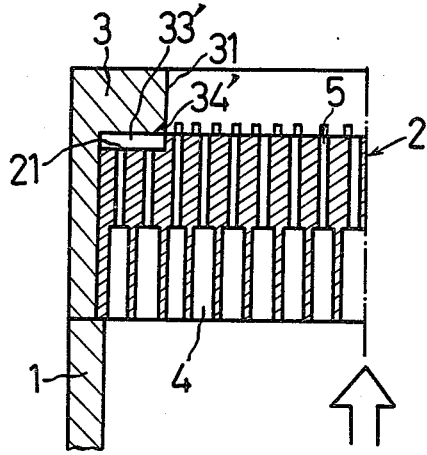
FIG. 7 and FIG. 8 show a second embodiment of the present invention.
Figure 8:
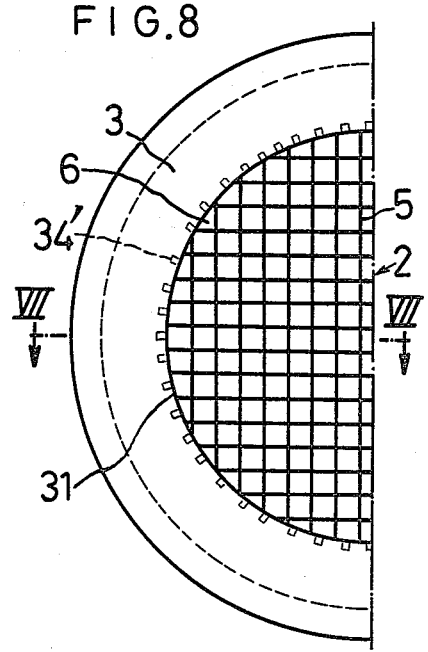

FIG. 7 and FIG. 8 show a second embodiment.

In the outer peripheral portion on the extrudable material outlet side of the die 2, a stepped portion 21 is formed. And between the stepped portion 21 and the opposed surface of the die mask 3, an annular groove 33' is formed along the whole circumference of the die 2. In the lower corner portion of the inner surface 31 of the die mask 3, a large number of openings 34' are cut so as to be communicated with the annular groove 33'.

When the honeycomb structure is extruded out of the device of the first or the second embodiment, the extrudable material such as ceramic, rubber and plastics which was supplied from the cylinder 1, following the arrow, is pressurized to be fed into the feed passageways 4 and the extrusion slots 5 of the die 2. Then, it is extruded into the interior of the die mask 3.

Since the extrusion slots of the outer peripheral portion of the die are covered by the die mask 3, one portion of the extrudable material supplied through the extrusion slots of the outer peripheral portion of the die moves to the uncovered extrusion slots through the transversely extending extrusion slots.

Another portion of the extrudable material supplied through the extrusion slots of the outer peripheral portion of the die enters into the grooves 33 or 33' of the die mask and is extruded into the interior of the die mask 3 from the openings 34 or 34'.

Figure 11:
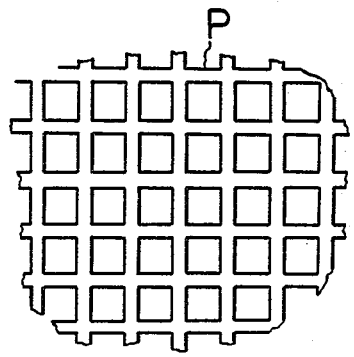
FIG. 11 and FIG. 13 are fragmentary plane views showing examples of the conventional honeycomb structures.

At the instant that the extruded body is extruded out of the die 2, in the outer periphery thereof, concave portions P are formed as shown in FIG. 11. According to the extrusion device of the present invention, when the extruded body is extruded out of the die 2, the extrudable material is supplied to the outer periphery thereof from the openings 34 or 34' formed in the die mask 3.

Figure 10:
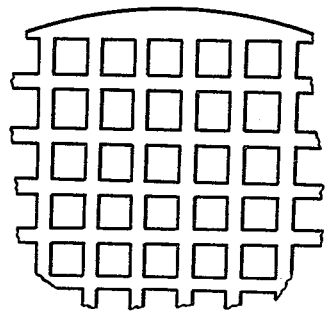
FIG. 10 and FIG. 12 are fragmentary plane views of the honeycomb structures obtained by the device of the present invention respectively.

Consequently, the concave portions P formed in the outer periphery of the extruded body are filled with the extrudable material. As a result, the honeycomb structure having a thicker outer wall in the most part of its outer periphery, and having a smooth outer peripheral surface as shown in FIG. 10 can be obtained.

In the extrusion devices of the present invention, the openings 34 or 34' are formed at predetermined intervals. Therefore, the greater portion of the extrudable material which is extruded from each opening is immediately dispersed in the directions along the outer periphery of the extruded body to fill the concave portions P.

Figure 4:
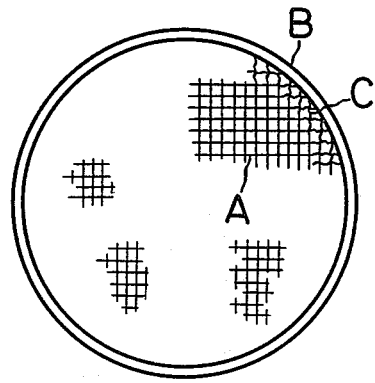
FIG. 4 is a schematic plane view of a defective honeycomb structure.

Therefore, the extrudable material which was supplied from each opening 34 or 34' does not abruptly press the extruded body from the outside thereof. Such distorted portions as shown in FIG. 4 are hardly observed in the obtained honeycomb structure produced by the devices of the present invention.

It is preferable to dispose the openings 34 or 34' so as to be opposed to the concave portions P of FIG. 11 of the outer periphery of the extruded body.

In the second embodiment shown in FIG. 8, the openings 34' open directly above the upper end surfaces 6 of the die 2 so as to be opposed to the concave portions P of the outer periphery of the extruded body.

Therefore, the extrudable material which was extruded out of the openings 34' fills the concave portions P of the outer periphery of the extruded body immediately.

The openings 34 of the first embodiment shown in FIG. 6 is preferable to be formed in the similar positions to those of the second embodiment.

The honeycomb structures which were obtained by the above described devices have a thicker outer wall respectively, and distortions are hardly produced in the wall portion so that an excellent mechanical strength can be obtained. Furthermore, the outer peripheral surface of the obtained honeycomb structure can be made smooth. Therefore, it is convenient as a catalyst support to be disposed in the exhaust system of an automobile.

In this case, air-tight condition between the casing and the catalyst support can be maintained good to prevent the gas from leaking therethrough.

Figure 1:
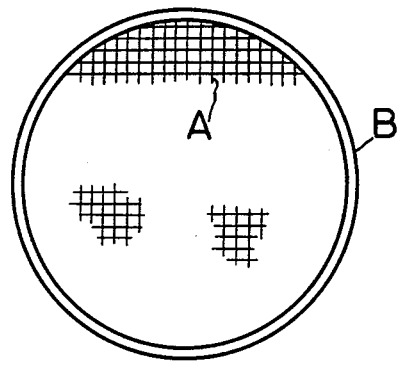
FIG. 1 is a schematic plane view of a honeycomb structure.
Figure 3:
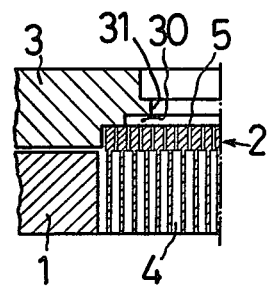
FIG. 2 and FIG. 3 are longitudinally sectioned views showing the conventional extrusion devices for producing the honeycomb structures.

In contrast, in the conventional extrusion devices such as the device shown in FIG. 3, the opening portion 30 is continuously formed along the whole circumference of the die mask 3. The extrudable material is supplied into the whole circumference of the obtained extruded body which was extruded out of the die 2 to press the extruded body toward the center thereof. As a result, such distorted portions C as shown in FIG. 4 are produced in the obtained honeycomb structure.

Figure 2:
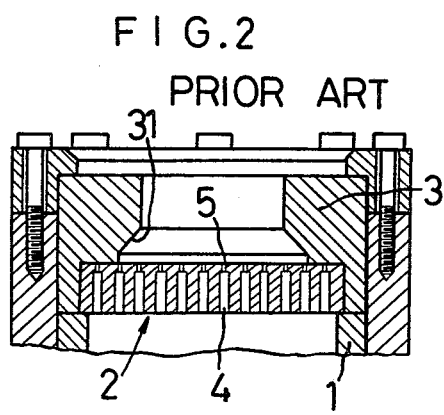

In the conventional device shown in FIG. 2, the extrudable material is squeezed toward the center of the die 2 by the tapered surface of the die mask 3 after being extruded out of the die 2. Therefore, similar distorted portions C are produced in the obtained honeycomb structure.

Figure 9:
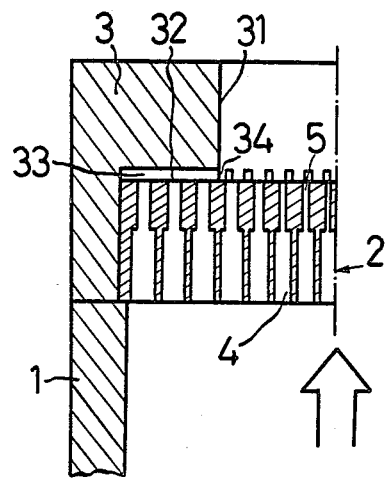
FIG. 9 is a fragmentary longitudinally sectioned view of a half of the device of a third embodiment.

FIG. 9 shows a third embodiment of the present invention. In the third embodiment, the width of both the extrusion slots 5 and the feed passageways 4 are made so as to be gradually increased radially outward.

The other structures are substantially equal to those of the first embodiment.

Figure 12:
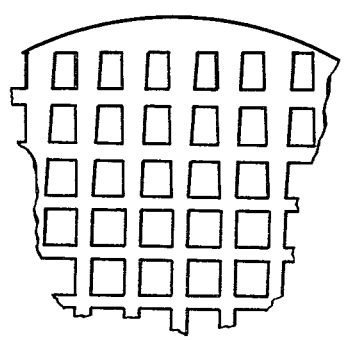

By this extrusion device, the honeycomb structure of which wall thickness is gradually made larger towards the outer wall thereof as shown in FIG. 12 is obtained.

Figure 13:
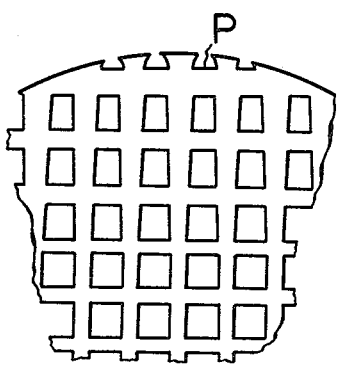

The outer peripheral surface of the obtained honeycomb structure becomes smooth since the concave portions P shown in FIG. 13 are filled with the supplied extrudable material. And the wall thickness does not abruptly change between the outer wall and the inner wall.

When the honeycomb structure having the above described structure is used as the catalyst support to be disposed within the exhaust system of an automobile, the slope of the thermal transfer from the center to the outer peripheral portion of the catalyst support becomes gentle so that an excellent thermal shock resistance can be obtained.

As described above, in the extrusion devices of the present invention, the extrudable material is supplied from the openings which are disconnectedly provided in the die mask at predetermined small intervals, into the outer periphery of the extruded body which was extruded out of the die. The concave and convex portions formed in the outer periphery of the extruded body are filled with the extrudable material which was supplied from the above described openings so that the honeycomb structure having a thicker outer wall and a smooth outer peripheral surface can be obtained.

The openings can be formed into a square, triangle, semi-circle or other shape respectively. And the area of each opening and the interval between two adjacent openings are freely selected in accordance with the desired pitch and the like of the open passages of the honeycomb structure.

Furthermore, each opening is preferable to be formed so as to be opposed to the concave portions formed in the outer periphery of the extruded body which is extruded out of the die.

Having now fully described the invention, it will be apparent to one of ordinary skill in the art that many changes and modifications can be made thereto without departing from the spirit or scope of the invention as set forth herein.

What is claimed is:

1. An extrusion device for producing honeycomb structures, comprising:
    a die provided with a large number of disconnected feed passageways which are formed on an extrudable material inlet side thereof in the axial direction thereof, and having
    a large number of interconnected grid-shaped extrusion slots which are formed on an extrudable material outlet side of said die in said axial direction and communicated with said feed passageways; and
    an annular die mask having a radially inner circular surface extending in said axial direction for defining the outermost peripheral surface of each said honeycomb structure,
    said die mask further having a radially extending annular end wall which at its radially inner peripheral edge connects to and extends radially outwardly from said circular surface and covers a predetermined number of said extrusion slots around the peripheral portion of said die on said extrudable material outlet side thereof;
    said die mask being provided with a plurality of disconnected openings which are formed at predetermined intervals in the said radially inner peripheral edge of said end wall and communicated with the said extrusion slots that are covered by said die mask for supplying at least part of the extrudable material which is extruded through said covered extrusion slots radially inwardly to aid in forming the outer periphery of the extruded honeycomb structure.

2. An extrusion device according to claim 1, wherein:
    said disconnected openings in said die mask compromise a plurality of radially extending grooves which are formed in said wall so as to be communicated with said extrusion slots;
    said grooves being formed along the whole circumference of said end wall at predetermined intervals and being communicated with the inner cavity surrounded by said die mask through said openings.

3. An extrusion device according to claim 1, wherein:
    said peripheral portion on said extrudable material outlet side of said die is cut into a stepped portion to form an annular groove between said stepped peripheral portion of said die and said wall of said die mask; and
    said inner peripheral edge of said wall of said die mask is partially cut to form said disconnected openings which are communicated with said extrusion slots of said peripheral portion of said die through said annular groove.

4. An extrusion device according to claim 2, wherein:
    the width of each of said feed passageways and said extrusion slots is gradually increased radially outward toward the outer wall of said die.

5. An extrusion device according to any one of claims 1 to 4, wherein:
    said openings are formed so as to open directly above the wall portions of said extrusion slots positioned along said die mask.

* * * * *